United States Patent [19]

Kay

[11] Patent Number: 5,417,860
[45] Date of Patent: May 23, 1995

[54] BOTTLE FILTER AND POURING DEVICE

[75] Inventor: Ronald J. Kay, Barrington, Ill.

[73] Assignee: Filtertek, Inc., Hebron, Ill.

[21] Appl. No.: 113,998

[22] Filed: Aug. 30, 1993

[51] Int. Cl.⁶ .............................................. B01D 35/04
[52] U.S. Cl. .................... 210/472; 210/474;
210/477; 210/485; 210/497.2
[58] Field of Search ................ 222/189; 210/473, 474,
210/475, 476, 477, 484, 485, 497.01, 472, 497.2

[56] References Cited

U.S. PATENT DOCUMENTS

| | | | |
|---|---|---|---|
| 647,580 | 4/1900 | Parker | 210/467 |
| 728,426 | 5/1903 | Timar | 215/308 |
| 872,407 | 12/1907 | Donahoe | 210/467 |
| 920,791 | 5/1909 | Tonini | 215/308 |
| 1,213,319 | 1/1917 | Whitaker | 215/308 |
| 2,839,056 | 6/1958 | Mailly | 210/473 |
| 3,926,348 | 12/1975 | Lutzker | 222/567 |
| 4,767,016 | 8/1988 | Cook, Jr. et al. | 220/88 |
| 4,792,454 | 12/1988 | Lenonnier | 426/8 |
| 4,947,737 | 8/1990 | Gladstone | 426/8 |
| 4,978,538 | 12/1990 | Gladstone | 426/8 |
| 5,122,272 | 6/1992 | Iana et al. | 210/473 |
| 5,167,819 | 12/1992 | Iana et al. | 210/473 |
| 5,173,192 | 12/1992 | Shalew | 210/473 |

*Primary Examiner*—Robert A. Dawson
*Assistant Examiner*—W. L. Walker
*Attorney, Agent, or Firm*—Robert E. Browne; Thomas C. McDonough

[57] ABSTRACT

A liquid filter device for use with bottles holding wine or other liquids, for use in filtering cork or other sediments from the liquid while pouring the liquid out of the bottle, comprising a generally tubular body which may be inserted into the neck of a bottle, where the body has a top portion open to the internal volume of the filter device and a bottom portion sealed from the internal volume, openings formed in the body, a filter located on the inside of the body to cover such openings and means for strengthening said body being integrally formed thereon.

12 Claims, 2 Drawing Sheets

BOTTLE FILTER AND POURING DEVICE

BACKGROUND OF THE INVENTION

This invention relates to a device used to filter out sediments, including cork, from a wine bottle or other bottle when the liquid therein is being poured out. It is a common problem that the cork in a wine bottle may be broken or severely damaged in an attempt to remove it from the neck of the bottle. Even if the damaged cork is removed from the bottle, it is highly likely that a portion of the cork will remain in the bottle and will be poured out with the wine or other liquid. In some cases it is impossible to completely remove the cork and is necessary to push the remaining cork into the bottle where it may contaminate the liquid with cork particles. Another use of such a device may be for bottles which have fruit pieces floating in the liquid for flavor. It is preferable to be able to pour the liquid out of the bottle without the fruit particles and without the need for a strainer.

SUMMARY OF THE INVENTION

It is an object of this invention to present a simple and inexpensive mechanism for use in filtering cork or other sediments from a bottle while pouring liquid out of the bottle. While this invention is most readily used in wine bottles due to the common use of corks with such bottles, it may be used in any similar bottle and the invention is not so limited. It is a further object of this invention to present a bottle filter mechanism which can also be used to assist in pushing the cork or other stopper into the bottle for access to the liquid.

This invention comprises a generally tubular filter mechanism composed of a plastic material such as polypropylene and which may be inserted into the neck of a wine or other similar bottle. The body of the device is preferably manufactured by one piece insert injection molding. The body has a plurality of openings formed at one end for liquid to enter the internal section of the body, and a cylindrically shaped filter located inside the body and covering said openings. The top of the device is open for liquid to be poured out of the internal section and includes means to seal the top of the bottle when the filter device is inserted therein. The bottom of the tubular body is sealed but includes a vent opening to assist in the flow of liquid out of the bottle through the filter.

The cylindrical filter used may be in the 100 to 300 micron range and is preferably a 200 micron filter, as it has been determined that this size filter is fine enough to filter undesired particles and contaminants such as broken cork pieces, yet still allows sediments which enhance the flavor of the wine to pass through. The filter device may be removed from the bottle after use, washed and reused.

It is preferred that the vent in the device be 0.125 inches in diameter. This size vent has been shown to allow for the highest possible flow rate and smoothest flow of fluid out of the bottle without excess splashing in and out of the glass using a 200 micron filter as described herein. As the filter size decreases, the vent size must be increased to allow for proper flow.

A further feature of this invention is the incorporation of ribs on the side of the cylinder to increase the strength of the device to assist in the removal of cork from the bottle neck. The additional stiffness provided by such ribs allows the user to use the device to push the cork through the bottle neck without a risk of damage to the filter device. The device is also of sufficient length to extend into the bottle and below the bottle neck to assist in blocking the cork in the liquid from the filter.

Further benefits and features of this invention will be made apparent in the detailed description of the drawings.

DETAILED DESCRIPTION OF THE DRAWINGS

Figure 1:
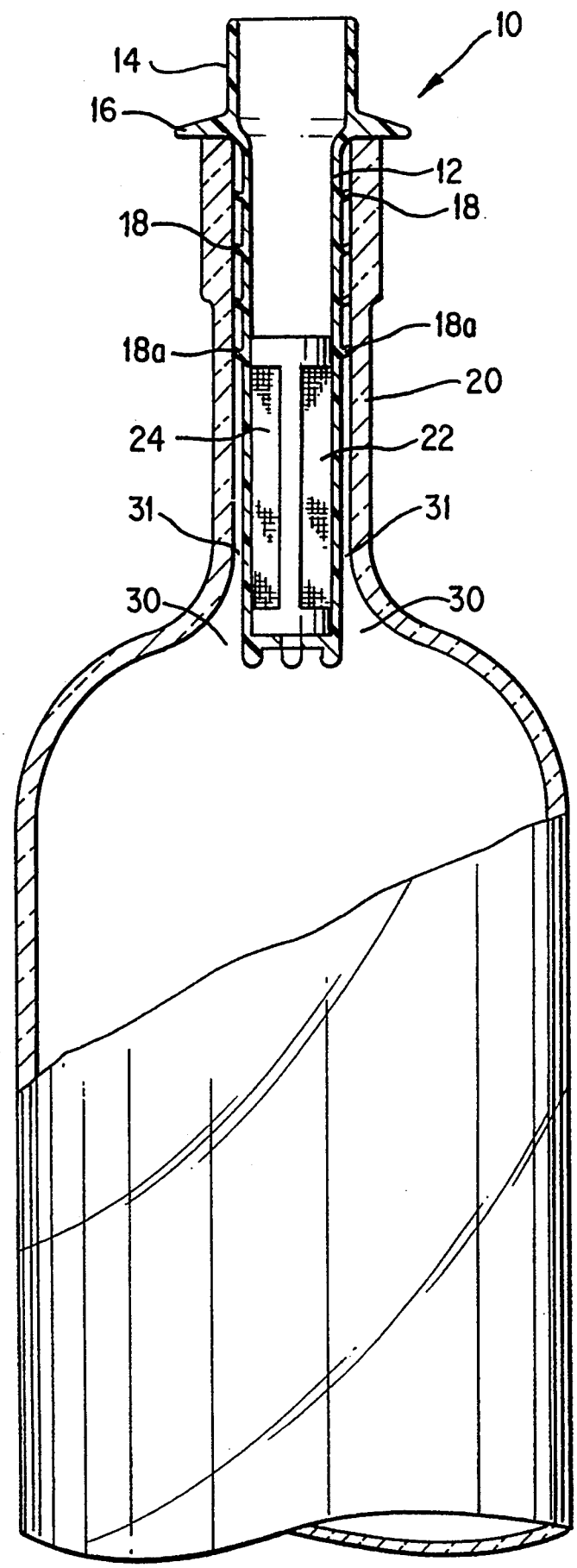
FIG. 1 is a cross-sectional view of the present invention as located inside the neck of a bottle.
Figure 2:
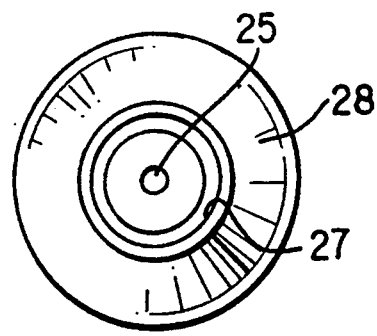
FIG. 2 is a top plan view of the filter mechanism in accordance with the present invention.

FIG. 1 shows the filter device 10 located inside the neck of a standard bottle 20. It is to be understood that there are many different bottle shapes currently in use for wine and other liquids, and this invention is intended to be usable in most if not all such bottle designs. The preferred embodiment described herein is intended to be illustrative of these various designs.

Figure 5:
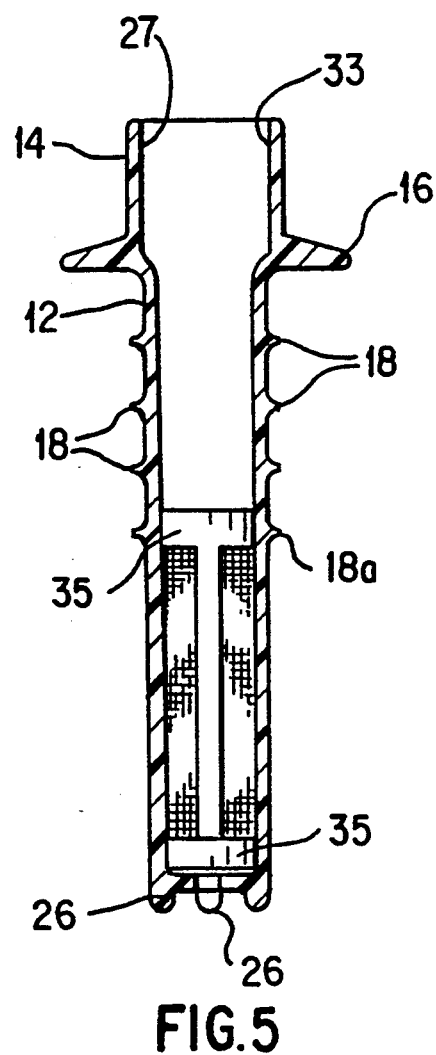
FIG. 5 is a cross-sectional side view of the filter mechanism in accordance with the present invention.
Figure 3:
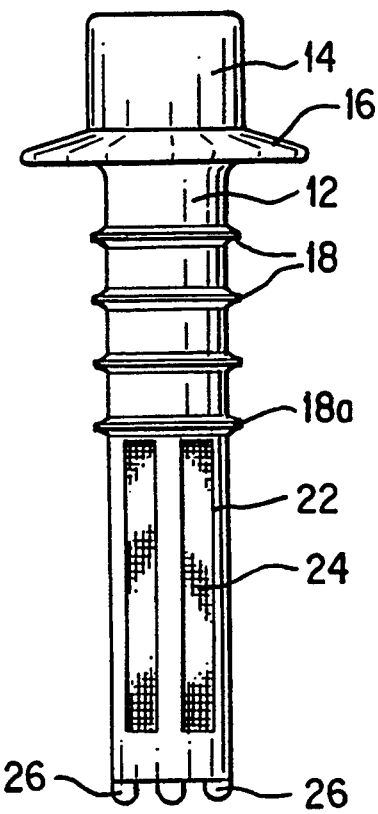
FIG. 3 is a side plan view of the filter mechanism in accordance with the present invention.

As shown most clearly in FIGS. 3 and 5, filter device 10 includes a generally tubular body 12 having a top and a bottom and an internal surface 33. The diameter of body 12 is sized to fit the internal diameter of most commercially available bottles. Most bottles in commercial use for products such as wine have an internal diameter of approximately 0.644 inches to 0.780 inches, and thus the diameter of this device could range accordingly. The preferred embodiment of this device is approximately 0.7 inches, although it could be readily manufactured in any size to fit different applications.

Integrally formed with body 12 at the upper end thereof are head 14 and cap 16, which is shaped to securely fit on the neck of bottle 20. Stiffening ribs 18 are also integrally formed on the upper portion body 12. Ribs 18 provide the necessary stiffness to the device 10 for insertion into the bottle 20, and are flexible enough to accommodate a bottle having an internal diameter which is slightly smaller than the diameter of the ribs 18. As shown most clearly in FIG. 1, it is preferred to locate the bottom rib 18a in close proximity to the top of filter 24, as bottom rib 18a acts to stop the flow of liquid. This configuration allows for the most efficient displacement of liquid from bottle 20 through filter 24.

Body 12 is of a length sufficient to allow it to extend into bottle 20 past the neck area 31, so that the shape bottle 20 can assist in the filtering process by providing a sufficient volume to prevent cork particles from blocking filter 24. As shown in FIG. 1, there is an area 30 inside bottle 20 where the cork particles will not block flow of liquid through the filters 24. To accomplish this feature for most commercially available bottles, the overall length of filter device 10 should be approximately four (4) inches, although the device could be manufactured in any length for different applications.

At the bottom portion of body 12 are a plurality of windows 22 into which fluid may flow. In the preferred embodiment shown, there are four windows equally spaced about the circumference of the body 12. Filter 24, which is preferably manufactured from polyester, is cylindrically shaped and located inside body 12 on internal horizontal walls 35 so that it covers each window 22. Therefore, any fluid entering the windows 22 must pass through filter 24. The filtered fluid then passes through the internal portion of filter device 10 before being poured out the opening 27 formed into top surface 28. The total surface area of the filter will vary depending on the length of filter 24, which length may be approximately 1.5 inches in a preferred embodiment, and the diameter of body 12.

Figure 4:
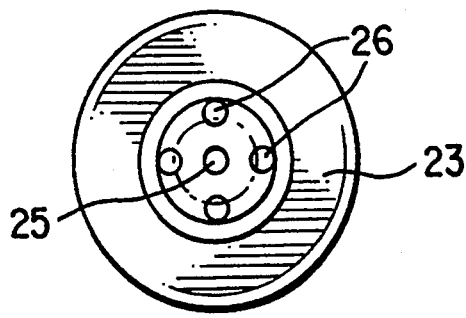
FIG. 4 is a bottom plan view of the filter mechanism in accordance with the present invention.

As shown most clearly in FIG. 4, the bottom of body 12 includes a plurality of nodes 26 integrally formed on bottom surface 23. These nodes 26 function to assist in pushing a cork that is stuck through the bottle neck, and assist in properly aligning the body 12 in the internal neck of bottle 20. A key to the present invention is the use of vent 25 formed in bottom surface 23 to allow air to pass through filter device 10 so that the fluid may flow more readily.

It is to be understood that the above description is intended to set forth the preferred embodiment of the invention and is not intended to limit the invention in any way. This invention should be read as limited by its claims only.

We claim:

1. A liquid filter device for use with a bottle, comprising
   a) a generally cylindrical body which may be inserted into the neck of said bottle, with said body having a top portion open to the internal volume of said body and a bottom portion sealed from said internal volume;
   b) openings formed in said body;
   c) means for filtering said liquid as it enters said cylindrical body, said filtering means being mounted on said body to cover said openings;
   d) means for venting air through said body of said filter device; and
   e) means for strengthening said body being integrally formed thereon.

2. A liquid filter device as set forth in claim 1, wherein said venting means comprises an opening in said bottom portion of said body.

3. A liquid filter device as set forth in claim 1, wherein said strengthening means comprises a plurality of ribs formed around the circumference of the cylindrical body.

4. A liquid filter device as set forth in claim 1, wherein said venting means comprises a hole formed in the bottom of said device.

5. A liquid filter device as set forth in claim 1, wherein said filter means comprises a polyester filter in the range of 100 microns to 300 microns.

6. A liquid filter device as set forth in claim 5, wherein said filter is a 200 micron polyester filter.

7. A liquid filter device as set forth in claim 1, further comprising a series of nodules formed on the external surface of said bottom portion.

8. A liquid filter device as set forth in claim 1, wherein said filter is mounted on the inside of said cylindrical body.

9. A liquid filter device for use with a bottle, comprising
   a) a body which may be inserted into the neck of said bottle, with said body having a top portion open to the internal volume of said body and a bottom portion sealed from said internal volume;
   b) openings formed in said body;
   c) means for filtering said liquid as it enters said body, said filtering means being mounted on said body to cover said openings, wherein said filter means comprises a polyester filter in the range of 100 microns to 300 microns; and
   d) means for venting air through said body of said filter device.

10. A liquid filter device as set forth in claim 9, wherein said venting means comprises an opening in said bottom portion of said body.

11. A liquid filter device as set forth in claim 9, wherein said venting means comprises a hole formed in the bottom of said device.

12. A liquid filter device as set forth in claim 9, further comprising a series of nodules formed on the external surface of said bottom portion.

* * * * *

UNITED STATES PATENT AND TRADEMARK OFFICE
CERTIFICATE OF CORRECTION

PATENT NO. : 5,417,860
DATED : May 23, 1995
INVENTOR(S) : Kay

It is certified that error appears in the above-indentified patent and that said Letters Patent is hereby corrected as shown below:

```
    Column 4, claim 9, line 31 thereof, please
delete the word "filter" before the word "means" and
substitute therefor the word ---filtering---.

Column 4, claim 9, line 32 thereof, please
delete the word "polyester" before the word "filter"
and substitute therefor the word ---mesh---.
```

Signed and Sealed this

Nineteenth Day of September, 1995

Attest:

BRUCE LEHMAN

*Attesting Officer*  *Commissioner of Patents and Trademarks*